United States Patent

Feucht et al.

[11] Patent Number: 6,092,371
[45] Date of Patent: Jul. 25, 2000

[54] TURBOCHARGING APPARATUS INCLUDING INTEGRAL EXHAUST BACKPRESSURE CONTROL MEANS

[75] Inventors: Dennis D. Feucht, Morton; Maurice E. Moushon, Peoria, both of Ill.

[73] Assignee: Caterpillar Inc., Peoria, Ill.

[21] Appl. No.: 09/030,458

[22] Filed: Feb. 25, 1998

[51] Int. Cl.$^7$ .................................................. F02D 23/00
[52] U.S. Cl. ............................................................... 60/602
[58] Field of Search ................................................. 60/602

[56] References Cited

U.S. PATENT DOCUMENTS

| | | |
|---|---|---|
| 2,622,390 | 12/1952 | Newton . |
| 2,629,541 | 2/1953 | Couture . |
| 3,389,553 | 6/1968 | Hardy et al. . |
| 3,423,926 | 1/1969 | Nancarrow et al. . |
| 3,557,549 | 1/1971 | Webster . |
| 4,005,578 | 2/1977 | McInerney ............................. 60/602 |
| 4,120,156 | 10/1978 | McInerney ............................. 60/602 |
| 4,220,008 | 9/1980 | Wilber et al. ......................... 60/602 |
| 4,235,076 | 11/1980 | Meloche et al. ...................... 60/602 |
| 4,612,770 | 9/1986 | Tadokoro et al. ..................... 60/602 |
| 4,617,799 | 10/1986 | Todokoro et al. ..................... 60/602 |
| 5,079,921 | 1/1992 | McCandless et al. ................. 60/602 |
| 5,410,882 | 5/1995 | Davies et al. ......................... 60/602 |
| 5,867,987 | 2/1999 | Halimi et al. ......................... 60/602 |

FOREIGN PATENT DOCUMENTS 0189121  1/1986  European Pat. Off. .

*Primary Examiner*—Noah P. Kamen
*Attorney, Agent, or Firm*—David L. Polsley; Larry G. Cain

[57] ABSTRACT

A turbocharger assembly for use with an internal combustion engine, the turbocharger assembly including a housing having an integral backpressure control valve assembly disposed in the turbine exhaust passage and an actuator assembly integral to the turbocharger housing, the actuator assembly being hydraulically operated by the pressurized engine lubricating oil supplied for lubricating the turbocharger, and the actuator assembly selectively actuating the backpressure control valve assembly in response to control signals generated by a control module based on engine coolant temperature and intake air temperature to optimize engine warm-up time and engine operating temperature.

22 Claims, 1 Drawing Sheet

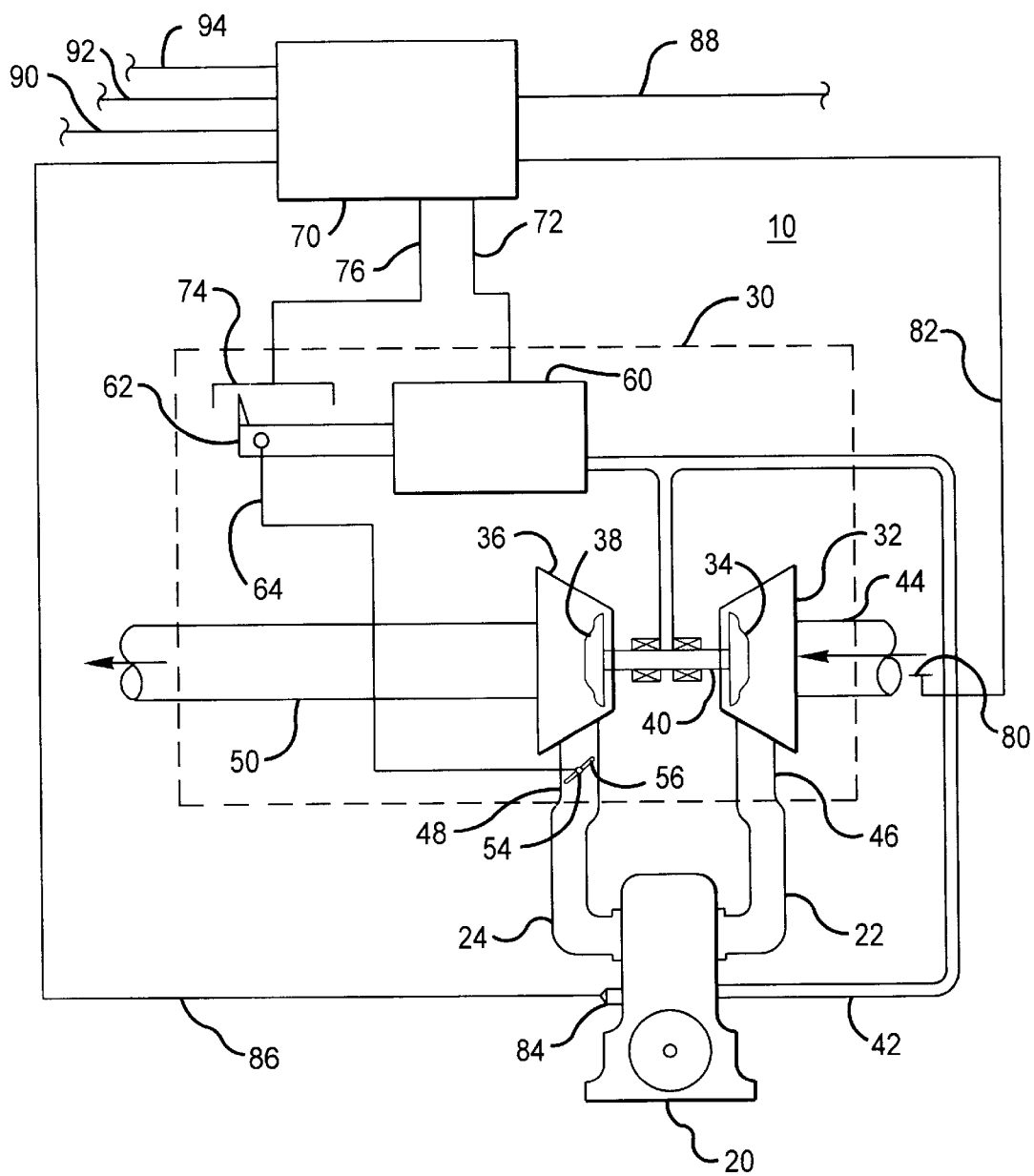
Fig. - 1 -

TURBOCHARGING APPARATUS INCLUDING INTEGRAL EXHAUST BACKPRESSURE CONTROL MEANS

TECHNICAL FIELD

This invention generally pertains to turbocharging apparatus for internal combustion engines, and more particularly to turbocharging apparatus having an integral exhaust backpressure valve and backpressure valve actuator means and methods for controlling exhaust backpressure in the exhaust manifold in internal combustion engines.

BACKGROUND ART

Turbochargers are commonly employed for providing improved operating characteristics and improved operating efficiency in internal combustion engines. Turbochargers typically include at least a compressor housing in which a compressor impeller is rotatably disposed and a turbine housing in which a turbine impeller is rotatably disposed, and a shaft linking the compressor impeller and the turbine to insure common operation. The turbine housing is typically connected to the exhaust manifold for receiving exhaust gases from the internal combustion engine so that the exhaust gases will impart energy to rotate the turbine in passing through the turbocharger. When the turbine is rotated, the compressor impeller is likewise rotated, causing compression of the air received into the compressor housing of the turbocharger which is then directed into the intake manifold of the internal combustion engine at a relatively higher pressure. Under ideal conditions, the turbocharger would reach a steady state condition in which the turbocharger would reach an ideal operating speed based on the desired amount of compression to be imparted to the intake air is perfectly balanced with the energy received from the exhaust gases.

In practice, of course, ideal operating conditions cannot be attained. Internal combustion engines are employed in various types of equipment which are operated at different altitudes with respect to sea level, under varying load conditions, and at various throttled engine speeds. When the engine is operated at lower engine speeds, less exhaust gas is available for providing energy to the turbine, as compared to that available at full engine speed. Likewise, as engine speed varies momentarily due to imposed load fluctuations, the amount of available exhaust gas to operate the turbocharger varies. In order to compensate for these changes and fluctuations in operating conditions, it is common to provide bypass valves or "waste gates" to provide a means of controlling the amount of exhaust gases directed from the exhaust manifold into the turbocharger turbine. Numerous examples of prior art may be discovered which provide various control apparatus and methodology for controlling the bypass valve to effectively control the amount of boost or increase in intake air pressure provided by the compressor impeller of the turbocharger.

It is also well known that internal combustion engines operate with the greatest fuel efficiency and the most desirable operating characteristics when the engine has reached its optimum operating temperature. In addition, it is well known that the typical internal combustion engine typically has greater undesirable emissions of unburned fuel when the engine is operating below its optimum operating temperature. In order to bring the typical internal combustion engine up to its desired operating temperature, it has been typical to provide restricted coolant flow, to prevent operation of the radiator fan so as to reduce cooling of the engine coolant, or to employ other similar strategies of controlling the engine coolant system.

The present invention is directed to overcoming one or more of the problems as set forth above.

SUMMARY OF THE INVENTION

The subject invention is a turbocharging system for use in an internal combustion engine, the turbocharging system having an exhaust backpressure valve integral to the turbocharger housing, preferably a butterfly-type valve disposed in the turbine inlet immediately preceding the turbine, the exhaust backpressure valve responsive to an electrohydraulic actuator electrically responsive to an engine controller and further including an engine operating temperature sensor and an actuator position sensor for indicating the engine operating temperature and the valve position to the engine controller, such that the valve may be operated to increase the backpressure within the exhaust manifold and the engine operating temperature when low engine operating temperature is detected.

BRIEF DESCRIPTION OF THE DRAWINGS

FIG. 1 shows in schematic form the turbocharging apparatus according to the present invention.

DESCRIPTION OF THE PREFERRED EMBODIMENT

A turbocharger apparatus generally according to the present invention is shown in FIG. 1 and referred to with reference number 10. The turbocharger apparatus 10 is shown as it is preferably employed in an engine 20. For purposes of description herein, the turbocharger apparatus 10 is described as it might be employed in connection with a typical piston-type internal combustion engine, although the engine does not itself constitute any part of the subject invention. As an aid to understanding the drawings and description herein, the terms "upper", "lower", "right", "left", and other directional or positional references are to be understood as referring to the relative positions in the drawing FIGURE, and not to the subject invention as it may be employed in practice.

In accord with typical practice, the engine 20 includes an intake manifold 22 which provides intake air to the engine and an exhaust manifold 24 which receives exhaust gases from the engine. In further accord with typical practice, the turbocharger apparatus 10 includes a turbocharger housing 30 of cast, forged, or machined metal which is bolted or affixed to the engine 20 in flow connection with the intake manifold 22 and the exhaust manifold 24.

The turbocharger housing 30 includes a compressor housing 32 in which is rotatably mounted a compressor impeller 34, and an exhaust turbine housing 36 in which is rotatably mounted an exhaust turbine 38. A turbocharger power shaft 40 extends through power shaft support bearings in the turbocharger housing 30 and joins the compressor impeller 34 and the exhaust turbine 38 for concurrent rotation. The power shaft support bearings and the power shaft 40 are lubricated in an oil bath of pressurized engine oil supplied through a lubricant passage 42 which is in flow connection with the engine 20 for receiving a constant supply of pressurized engine lubricating oil.

The compressor housing 32 includes an intake air inlet 44 for receiving supply air, for example from an intake air filter assembly (not shown), for use in the engine 20, and a compressor outlet 46 in flow connection with the intake air manifold for supplying compressed air to the intake manifold 22. Similarly, the exhaust turbine housing 36 includes an exhaust turbine inlet 48 in flow connection with the exhaust manifold 24 for receiving exhaust gas byproducts from the engine 20, and an exhaust turbine outlet passage 50 in flow connection with an exhaust outlet apparatus such as a muffler or catalytic converter (not shown) for permitting exhaust of the exhaust gas byproducts.

An exhaust backpressure valve assembly 54 is disposed in the exhaust turbine inlet passage 48. The exhaust backpressure valve assembly 54 includes a moveable valve element 56 for selectively and adjustably blocking and restricting the turbine inlet passage 48 and controlling the exhaust gas flow by controlling the proportion of flow cross-section available for exhaust gas flow. The moveable valve element 56 is responsively connected to a valve actuator assembly 60.

The valve actuator assembly 60 is preferably an electronically controlled, hydraulically actuated assembly disposed within and integral to the turbocharger housing 30. The valve actuator assembly 60, being integral to the turbocharger housing 30, is in flow connection with the pressurized engine oil flowing into the turbocharger housing 30 through the lubricant passage 42. This engine oil supply is employed as a source of hydraulic power to hydraulically actuate the actuator assembly 60. A moveable actuator element 62 is preferably connected mechanically by an actuator link 64 to the valve element 56 so that linear movement of the actuator element 62 is translated by the actuator link 64 into angular or rotary movement of the valve element 56.

Various types of actuator assemblies 60 are known to those skilled in the relevant art. However, for purposes of this description, the actuator assembly 60 includes a reciprocally operable hydraulic piston 60 responsive to pressurized engine oil to induce movement of the actuator arm. Electrically operated control valves are provided within the actuator assembly 60 which are responsive to control signals to cause the desired movement of the actuator element 62.

A control module 70 is electrically connected to the actuator assembly 60 via the actuator control wiring 72 which transmits the control signals from the control module 70 to the actuator assembly 60. The control module 70 is also electrically connected to an actuator position sensor 74 by the position sensor lead 76. The position sensor 74 may be of any type known to those skilled in the relevant art as commonly employed for generating an electrical signal corresponding to the position of the actuator assembly 60 such that the control module 70 receives through the sensor lead 76 a signal indicating the actual status and position of the actuator assembly 60.

The control module 70 is further electrically connected by an air temperature sensor lead 80 to an intake air temperature sensor 82 disposed in the intake air flow to generate an electrical signal corresponding to the intake air temperature at some point prior to its use in the engine 20, preferably adjacent the intake air inlet of the turbocharger housing, although the intake air temperature sensor could be disposed at alternative points in the intake air flow.

A coolant temperature sensor 84 is disposed in the engine 20 for generating an electrical signal corresponding to the temperature of the engine coolant within the engine 20, with a coolant temperature lead 86 providing an electrical connection from the coolant temperature sensor 84 to the control module 70 to transmit the temperature signal to the control module 70.

The control module 70 draws electrical power through power lead 88 and contains a central processing unit with supporting Read Only Memory and Random Access Memory in which is contained a control algorithm. The components of the control module will be readily understood by those skilled in the art of computers, electronic control modules, and electrical controllers. While the control module 70 comprises a portion of the turbocharger apparatus 10, the components of the control module 70 are not in themselves new or novel. Furthermore, the control module 70 may be a self-contained unit operating in response to the control algorithm employed in the subject invention or alternatively may be incorporated into the Electronic Control Module commonly found in modern engines, with the control algorithm comprising a sub-routine to the engine control programming of the Electronic Control Module. In that alternative case, additional electrical sensor input means will be provided. Some exemplary additional input signal means, which is not intended to be exhaustive or limiting as to the number or types of additional inputs which may be employed, are shown by additional lead connections, to-wit: instantaneous engine speed in RPM 90; turbocharger boost pressure 92; throttle setting or fuel supply rate 94.

In operation, the engine 20 is started and brought into operation, withdrawing air from the intake manifold 22 and ejecting exhaust gases and byproducts into the exhaust manifold 24. The exhaust gases, being under pressure, proceed through the exhaust turbine inlet 48 into the exhaust turbine housing 36 and drive the exhaust turbine impeller 38, which imparts energy to the compressor impeller 34 by way of the turbocharger power shaft 40. The compressor impeller 34 causes intake air to be drawn in through the intake air inlet 44, compresses that intake air and delivers the compressed intake air through the compressor outlet 46 to the intake manifold 22. As the engine 20 operates, pressurized lubricating oil is forced through the lubricating passage 42 to lubricate the bearings and the turbocharger power shaft 40, and to provide hydraulic power to the actuator assembly 60.

Electrical power is provided through the power lead 88 to the control module 70 simultaneous with engine 20 startup and is continuously provided during the operation of the engine 20. The control module 70 determines the temperature of the engine 20 based upon the signal provided by the engine coolant temperature sensor 84 through the coolant sensor lead 86. If the sensed coolant temperature is below normal operating temperature, the control algorithm causes a control signal to be sent through the control wiring 72 from the control module 70 to the valve actuator 60. The valve actuator 60 is electrically actuated to permit pressurized engine lubricating oil to act hydraulically upon and laterally move the actuator element 62. The movement of the actuator element 62 is translated kinematically into movement of the actuator link 64 which is mechanically coupled thereto, which in turn causes a rotation of the backpressure valve element 56 and a reduction in the cross-sectional area of the exhaust turbine outlet passage 50 available for gas flow from the turbine housing 36. This reduction in cross-sectional flow area increases the backpressure of the exhaust gases retained in the turbine housing 36 and the exhaust manifold 24. This increase in backpressure causes the engine 20 to be heated at an increased rate, as the heat from the retained exhaust gases transfers to the engine 20.

As the actuator element 62 is moved, its position is sensed by the actuator position sensor 74 and indicated to the control module 70 by a corresponding signal in the position sensor lead 72. Since the relationship between the movement of the actuator element 62 and the rotation of the backpressure valve element 56 is known, the reduction in cross-sectional flow area in the exhaust turbine outlet passage 50 is also known. The control algorithm of the control module 70 causes the actuator 60 to move the actuator element 62 to increase the backpressure in the exhaust manifold 24 and thus increase the engine coolant temperature, while not increasing the backpressure of the exhaust gases above that pressure which would substantially impede the operation of the engine 20.

When the sensed coolant temperature is within the normal operating temperature range, the control algorithm again causes a control signal to be sent through the control wiring 72 from the control module 70 to the valve actuator 60. The valve actuator 60 is electrically actuated to permit pressurized engine lubricating oil to act hydraulically upon and laterally move the actuator element 62 to increase the cross-sectional area of the exhaust turbine outlet passage 50 available for gas flow from the turbine housing 36. This increase in the cross-sectional flow area permits a more free flow of the exhaust gases from the exhaust manifold 24 and reduces the heating effect of the exhaust gases.

Preferably, the control module 70 cooperates with or is included in an Electronic Control Module (ECM), as may be provided to control various functions of the engine 20, so as to optimize the operation of the engine 20. The additional sensor inputs of engine speed 90, turbocharger boost 92, and fuel supply rate 94 further aid in optimizing control of the backpressure valve element 56. In the event that the backpressure valve element 56 is rotated so as to cause excessive restriction of the exhaust gas flow, a corresponding reduction in engine speed 90 or fuel supply rate 94 would be sensed by the ECM and the backpressure valve element 56 would be actuated by the actuator 60 to reduce exhaust gas backpressure. Similarly, a loss of turbocharger boost 92 could result from excessive restriction of exhaust gas flow, which could be sensed and compensated for by adjustment of the backpressure valve element 56 by the ECM. Conversely, excessive fuel supply rate might indicate the need for an increase in backpressure to warm the engine 20 and improve its operating efficiency.

As the actuator element 62 is moved, its position is sensed by the actuator position sensor 74 and indicated to the control module 70 by a corresponding signal in the position sensor lead 72. Since the relationship between the movement of the actuator element 62 and the rotation of the backpressure valve element 56 is known, the reduction in cross-sectional flow area in the exhaust turbine outlet passage 50 is also known. The control algorithm of the control module 70 causes the actuator 60 to move the actuator element 62 to increase the backpressure in the exhaust manifold 24 and thus increase the engine coolant temperature, while not increasing the backpressure of the exhaust gases above that pressure which would substantially impede the operation of the engine 20.

Those skilled in the relevant art will understand that the turbocharger apparatus 10, as described, may be manufactured in various mechanical configurations without substantially altering the underlying nature of the present invention. Also, the turbocharger apparatus 10 may be employed in those engines 20 which provide an air-fuel mixture to the turbocharger apparatus 10 rather than air only, as necessary to meet the requirements of the engine 20 in which the turbocharger apparatus is employed.

Several advantages are provided by the turbocharger apparatus 10 according to the subject invention. The actuator 60, being integral to the turbocharger housing 30, is relatively immune to damage or to the influence of dirt or contaminants which might otherwise inhibit the proper operation of the actuator 60. The actuator 60 does not require a separate supply of pressurized hydraulic fluid, as a portion of the engine lubricating oil normally supplied to the turbocharger is simply directed to the actuator 60 when hydraulic power is required for its operation, thus minimizing the initial expense of the turbocharger apparatus 10 as well as avoiding the necessity for modifications or changes to the design of the engine 20. Likewise, the integral valve assembly 54 can be relatively compact and inexpensive, and, being contained within the turbocharger housing 30, is also relatively immune to damage or to the influence of dirt or contaminants.

A simple and easily installed wiring harness containing the control wiring 72 and the position sensor lead 76 permits the installation of the turbocharger apparatus 10 to be accomplished with minimal expense or modification to the engine 20 or the vehicle in which it is employed, where applicable. Furthermore, maintenance is easily accomplished by removal of the turbocharger housing 30 for easy access to all mechanical components of the turbocharger apparatus 10.

The turbocharger apparatus 10 provides additional benefits in causing more rapid engine warm-up where the engine temperature is below normal operating temperature, improving fuel efficiency and reducing pollutant emissions caused by engine operation below the normal operating temperature.

Modifications to the preferred embodiment of the subject invention will be apparent to those skilled in the art can be obtained from a study of the drawings, the disclosure and within the scope of the claims that follow:

What is claimed is:

1. A turbocharger assembly for use in conjunction with an engine, said turbocharger assembly comprising:

a controller for generating a signal;

a turbocharger housing defining an exhaust turbine outlet passage for permitting a flow of exhaust gases from said turbocharger housing, said turbocharger housing further including a backpressure valve actuator assembly having an actuator element operably responsive to said signal, said turbocharger housing further includes an actuator position sensor connected to said controller by a position sensor, said actuator position sensor generating a signal corresponding to the position of said actuator element and transmitting said position signal to said controller; and, a backpressure valve assembly disposed in said exhaust turbine outlet passage, said backpressure valve assembly including a selectively moveable backpressure valve element for selectively restricting the flow of exhaust gases in said exhaust turbine outlet passage to increase the relative backpressure of exhaust gases in said turbocharger housing, said backpressure valve element linked to said actuator assembly for operation in response thereto.

2. The turbocharger apparatus as set forth in claim 1 wherein said turbocharger apparatus includes an engine temperature sensor being connected to said controller for sensing the operating temperature of an engine associated with said turbocharger apparatus.

3. The turbocharger apparatus as set forth in claim 2 wherein said controller being a control module including a control algorithm and a processor for receiving said signal and an engine temperature signal and generating a control signal according to the control algorithm in response to said signal and said control signal.

4. The turbocharger apparatus as set forth in claim 3 wherein said turbocharger housing further defines an engine lubricating oil passage in flow connection with said actuator assembly for providing pressurized engine lubricating oil thereto.

5. The turbocharger apparatus as set forth in claim 4 wherein said actuator assembly includes a piston hydraulically responsive to said pressurized engine lubricating oil and control valves electrically responsive to said control signal from said control module so as to cause selective lateral, bi-directional motion of the actuator element in response to the control signal from said control module.

6. The turbocharger apparatus as set forth in claim 5 wherein said turbocharger apparatus further includes an actuator link connected to said actuator element and to said backpressure valve element for translating said lateral motion of the actuator element to angular motion of the backpressure valve element.

7. The turbocharger apparatus as set forth in claim 6 wherein said backpressure valve element is a butterfly valve rotationally disposed in said exhaust turbine outlet passage for blocking a selected proportion of cross-sectional area of said exhaust turbine outlet passage.

8. The turbocharger apparatus as set forth in claim 6 wherein said control module is an engine control module and said control algorithm is a sub-routine of the engine control algorithm.

9. The turbocharger apparatus as set forth in claim 8 wherein said control module is electrically connected to additional input means and said control module generates said control signal in response to said signal, said engine temperature signal, and said additional input means.

10. The turbocharger apparatus as set forth in claim 9 wherein said additional input means includes means for sensing engine operating speed and providing an electrical signal indicating said engine operating speed to said control module.

11. The turbocharger apparatus as set forth in claim 9 wherein said additional input means includes means for sensing turbocharger pressure boost and providing an electrical signal indicating said turbocharger pressure boost to said control module.

12. The turbocharger apparatus as set forth in claim 9 wherein said additional input means includes means for sensing fuel supply rate and providing an electrical signal indicating said fuel supply rate to said control module.

13. A turbocharger assembly for use in conjunction with an engine, said turbocharger assembly comprised of:

a turbocharger housing defining an exhaust turbine outlet passage for permitting a flow of exhaust gases from said turbocharger housing, said turbocharger housing further including a backpressure valve actuator assembly having an actuator element operably responsive to said control signal and a position sensor disposed in said turbocharger housing for generating an electrical position signal corresponding to the position of said actuator element; and, a backpressure valve assembly disposed in said exhaust turbine outlet passage, said backpressure valve assembly including a selectively moveable backpressure valve element for selectively restricting the flow of exhaust gases in said exhaust turbine outlet passage to increase the relative backpressure of exhaust gases in said turbocharger housing, said backpressure valve element linked to said actuator assembly for operation in response thereto;

an engine temperature sensor for generating an electrical engine temperature signal; and a control module for generating a control signal, said control module including a control algorithm and a processor for generating a control signal according to the control algorithm in response to said position signal and said engine temperature signal, said control algorithm operating said actuator assembly to cause an increase in exhaust gas backpressure when engine operating temperature is not within the normal operating range, and operating said actuator assembly to cause a decrease in exhaust gas backpressure when said engine operating temperature is within the normal operating range.

14. The turbocharger assembly as set forth in claim 13 wherein said turbocharger housing further defines an engine lubricating oil passage in flow connection with said actuator assembly for providing pressurized engine lubricating oil thereto.

15. The turbocharger apparatus as set forth in claim 14 wherein said actuator assembly includes a piston hydraulically responsive to said pressurized engine lubricating oil and control valves electrically responsive to said control signal from said control module so as to cause selective lateral, bi-directional motion of the actuator element in response to the control signal from said control module.

16. The turbocharger apparatus as set forth in claim 15 wherein said turbocharger apparatus further includes an actuator link connected to said actuator element and to said backpressure valve element for translating said lateral motion of the actuator element to angular motion of the backpressure valve element.

17. The turbocharger apparatus as set forth in claim 16 wherein said backpressure valve element is a butterfly valve rotationally disposed in said exhaust turbine outlet passage for blocking a selected proportion of cross-sectional area of said exhaust turbine outlet passage.

18. The turbocharger apparatus as set forth in claim 16 wherein said control module is an Engine Control Module and said control algorithm is a sub-routine of the engine control algorithm.

19. The turbocharger apparatus as set forth in claim 18 wherein said control module is electrically connected to additional input means and said control module generates said control signal in response to said position signal, said engine temperature signal, and said additional input means.

20. The turbocharger apparatus as set forth in claim 19 wherein said additional input means includes means for sensing engine operating speed and providing an electrical signal indicating said engine operating speed to said control module.

21. The turbocharger apparatus as set forth in claim 19 wherein said additional input means includes means for sensing turbocharger pressure boost and providing an electrical signal indicating said turbocharger pressure boost to said control module.

22. The turbocharger apparatus as set forth in claim 19 wherein said additional input means includes means for sensing fuel supply rate and providing an electrical signal indicating said fuel supply rate to said control module.

* * * * *